United States Patent [19]
Ullmann et al.

[11] 3,975,608
[45] Aug. 17, 1976

[54] METHOD AND APPARATUS FOR REGULATING THE GAP DISTANCE IN ELECTRO-EROSION MACHINING

[75] Inventors: Werner Ullmann, Locarno; Bernd Schumacher, Losone; Robert Farinelli, Losone; Arnold Zimmerman, Losone; Paul Fricker, Losone, all of Switzerland; Michel Durin, Paris, France

[73] Assignee: A.G. fur industrielle Elektronik AGIE Losone b. Locarno, Losone, Switzerland

[22] Filed: Apr. 12, 1974

[21] Appl. No.: 460,432

Related U.S. Application Data

[63] Continuation of Ser. No. 301,014, Oct. 26, 1972, abandoned.

[30] Foreign Application Priority Data

Apr. 6, 1972 Switzerland.......................... 5070/72

[52] U.S. Cl. ..................... 219/69 NN; 219/69 G; 219/69 V

[51] Int. Cl.² ............................................. B23P 1/08
[58] Field of Search........... 219/69 V, 69 R, 69 NN, 219/69 G, 69 C; 22/406

[56] References Cited
UNITED STATES PATENTS

| | | | |
|---|---|---|---|
| 3,433,919 | 3/1969 | Braudeau et al.................. | 219/69 V |
| 3,564,190 | 2/1971 | Kandajan.......................... | 219/69 V |
| 3,663,785 | 5/1972 | Hausermann..................... | 219/69 V |
| 3,663,786 | 5/1972 | O'Connor......................... | 219/69 V |
| 3,671,705 | 6/1972 | Raznitzyn......................... | 219/69 V |

*Primary Examiner*—Bruce A. Reynolds
*Attorney, Agent, or Firm*—William R. Woodward

[57] ABSTRACT

A workpiece-supporting table of an electro erosion machining equipment is provided with a mechanism for subjecting the workpiece to a circling motion of continuously variable radius during operation from zero to a maximum value. The same tool electrode can be used, without withdrawal from the work, for coarse machining at first and fine machining under circling movement immediately thereafter.

12 Claims, 7 Drawing Figures

METHOD AND APPARATUS FOR REGULATING THE GAP DISTANCE IN ELECTRO-EROSION MACHINING

This is a continuation of application Ser. No. 301,014, filed Oct. 26, 1972, now abandoned.

This invention relates to a method for equalizing the spacing between the machined contours of a work piece and the machining tool in electric discharge machining or electrochemical machining using one and the same tool electrode, and more particularly with such methods utilizing a circular movement with a particular eccentricity. The invention further relates to an apparatus for carrying out such a method.

In the practice of electrochemical machining, also known as ECM, it is necessary to provide supplementary movements after rough machining when it is desired to perform a smoothing and polishing operation after a rough machining, in order to bring the tool and work piece electrodes closer together. In the case of electric discharge machining, which is also known as EDM for short, it is common to provide at first a coarse machining, sometimes referred to as scouring followed by fine machining which may consist of only one smoothing operation or may consist of a preliminary smoothing and a fine smoothing or polishing. If with either type of electric erosion machining cavities of simple or complicated geometry or engravings are to be produced on work pieces, the first step is to machine with a scouring electrode which has smaller dimensions than the cavity or engraving to be produced. Since in the case of scouring the process operates with higher electrical potential and power, the working gap between the scouring electrode and the work piece is greater than in the case of the following fine machining. When, for fine machining, there may be, for example, first a prepolishing electrode of somewhat greater dimensions than the scouring electrode. Thereafter a final polishing electrode with dimensions still greater than those of the prepolishing electrode will be used. The final polishing electrode has the dimensions of the cavity or engraving to be produced less the small distance of the final working gap. For the production by either form of electroerosion machining of a single cavity or engraving it has accordingly been necessary to employ several tool electrodes with different physical dimensions. Very high requirements in the tolerances of the physical dimensions of such tool electrodes are applied in practice for their production, so that their fabrication is expensive.

In order to avoid this disadvantage in the succession of coarse and fine machining a type of apparatus has become known for electric discharge machining (Swiss Pat. No. 382,326, Languepin, which corresponds to U.S. Pat. No. 3,433,919, Braudeau et al) in which the tool electrode, after coarse machining, is withdrawn from the work piece and a certain eccentricity is applied in the setting of the tool electrode. The tool electrode then executes a circling movement of the amplitude of the fixed eccentricity adjustment and is then lowered or advanced into the work piece. The amplitude or stroke of the eccentric movement, i.e. the eccentricity, cannot be varied during the machining process. On this account the disadvantage arises that only the forward portion of the tool electrode, with reference to the direction of advance, is effective and thereby produces any great erosion. The erosion occurs particularly at the corners of the tool electrode, which have to remove a volume increased by the circling movement. Hence the worn tool electrode must in certain conditions still be replaced with a new one with exactly the same original dimensions before the end of the machining operation in the case of particular requirements in the sharpness of engraving. The preparation of a collection of tool electrodes and the interruptions of the electric discharge machining process by the necessity of changing electrodes increases the expense of producing cavities or engravings. A further disadvantage of the known apparatus is that the power consumption of electric discharge machining must be limited in the event that a line contact should arise between work piece and tool electrode. If the electric power were not limited, an undesired arc might arise.

In another known form of apparatus, for example that of U.S. Pat. No. 3,539,754 to Furze, the tool electrode is set into circling motion with a fixed eccentricity (i.e. radius and at the same time lowered or advanced into the work piece. As a result of risk of line contact between the tool electrode and the work piece there arise the same large mounting arrangements for electrodes and the reduced electric power as described in the case of the other known arrangements. The amount of the eccentricity can be appreciably changed only when the tool electrode is pulled out of the work piece and a new eccentric component is inserted in the apparatus in its nonoperating position. In order to obtain a small change in eccentricity the stop pin for the eccentricity ring which is increased in size by the amount of the eccentricity can be extended in conical form so that the circling movement will become slightly smaller depending on the amount of advance and a corresponding conicity is produced in the work piece. The cone is, however, not reversible. In practice this principle has proved to be unpractical, because the amount of eccentricity is set by the friction drive unsystematically and unsteadily and can be influenced by inertia and fluid flow forces. A further disadvantage showed up in that the precision of the geometry of the cavities depends on chance and is difficult to specify.

As the tool electrode in both known forms of apparatus has the circling motion, a difficult construction of the tool chuck and mounting and of the advancing mechanism for the tool electrode became necessary. The many mechanical components in operative connection to each other have many articulations and guide or camming surfaces, so that the entire contraption is heavy and has no really good precision. This disadvantage is noticeable in the dynamic properties and adjustment precision of the servodrive operating in the feed direction.

It is an object of the invention to overcome the disadvantages of the known machines, such as wear of the forward portions of the tool electrode, the heavy mountings, the use of several tool electrodes with exactly the same physical dimensions and the reduced electric power level and, more particularly, to make possible the variation of the eccentricity of circling movement during electric discharge machining or during electrochemical machining continuously from a zero value up to a maximum value or down from such maximum value to zero.

It is a further object to perform electroerosion machining of either type including both coarse and fine machining without the necessity of removing the tool electrode out of the work piece for change of eccentricity of movement or for replacement of the electrode, so that electroerosion machining can proceed from coarse machining to fine machining without interruption.

It is a further object to increase the precision of electroerosion machining by applying a circling movement to the work piece rather than to the tool electrode, thereby avoiding complication of the electrode holding means and preventing degradation of the dynamics of the electrode positioning operation. It is to be understood, however, that under special technical conditions the principle of the invention may also have some application to the provision of circling movement for the tool electrode.

Subject matter of the present invention: Briefly, during or after, or both during and after the lowering or advancement of the tool electrode into the work piece, the carrier on which the work piece is made fast is subjected to a circling movement with continuously variable eccentricity and the eccentricity is changed during the circling movement. Apparatus according to the invention, again briefly stated, utilizes a carrier for the work piece mounted on at least two driving means involving a plurality of rotating shafts and the eccentricity of the driving means with respect to the axes of the corresponding shafts is variable by rotatable adjusting means. In an alternative form the carrier for the work piece is provided in the form of a cross table which can be subjected to a circling movement of variable eccentricity by electric control of drive motors.

The invention will be described by way of example with reference to the accompanying drawings, wherein.

Figure 1A:
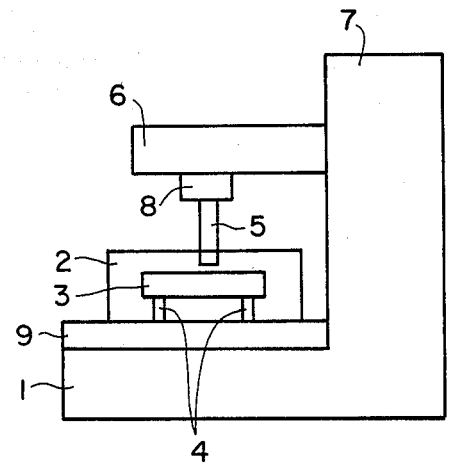
FIG. 1A is a side elevation view in schematic outline form of an electroerosion machine.

The electroerosion machine shown in FIG. 1 can be used either for electric discharge machining or for electrochemical machining. It comprises a base 1, on which the container 2 for the dielectric or electrolytic medium is supported. In the container is located the work piece 3, which is fixed on supports 4. The tool electrode 5 is lowered or advanced in the direction of work piece 3 by a feed mechanism 6. The feed mechanism 6 is movably mounted on the upright portion of the base 7. The tool electrode 5 is firmly mounted on the feed mechanism 6 by means of a chuck 8.

Figure 2:
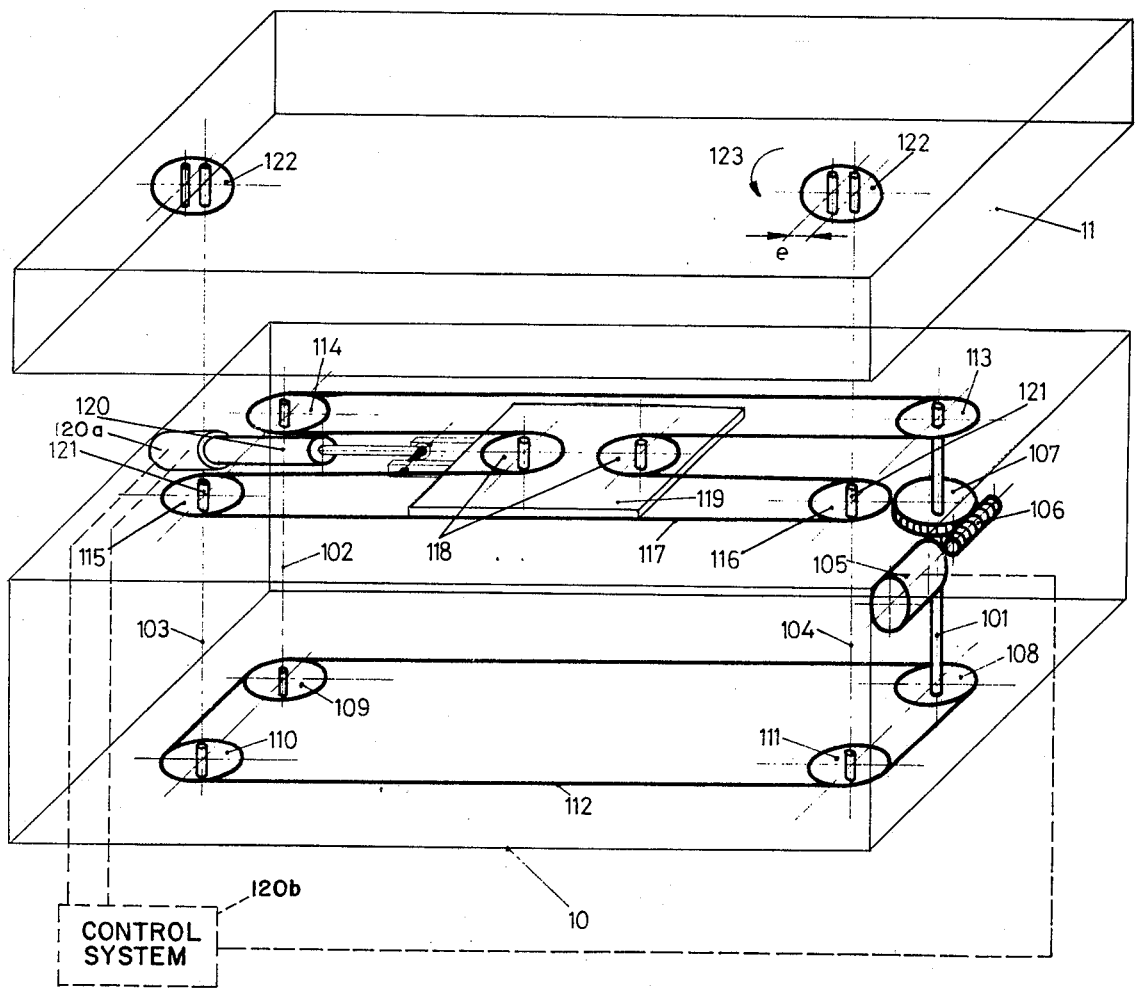
FIG. 2 is a schematic exploded perspective view of an illustrative embodiment of apparatus according to the invention.
Figure 3:
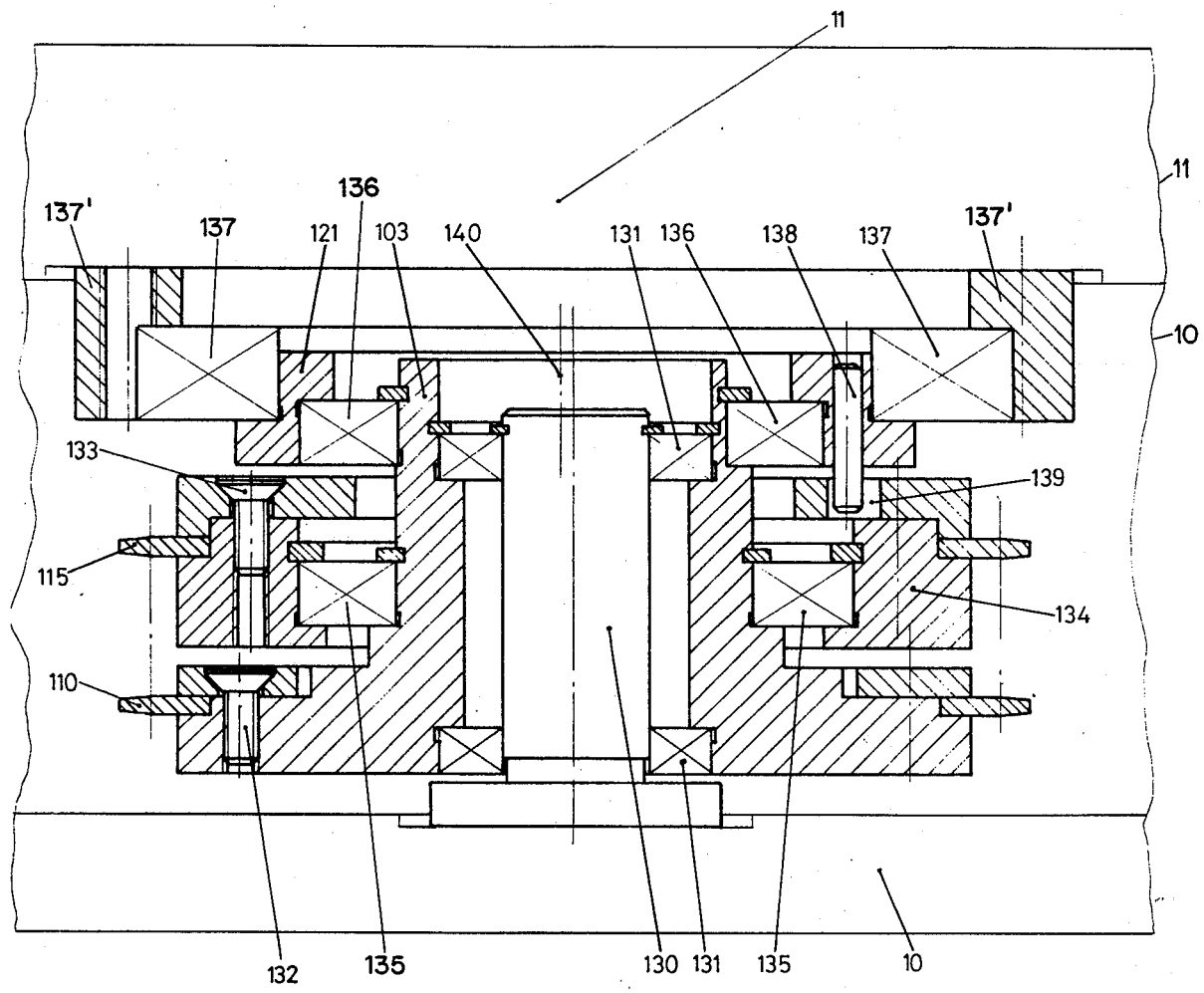
FIG. 3 is a section showing the physical construction of part of the apparatus schematically shown in FIG. 2.
Figure 4:
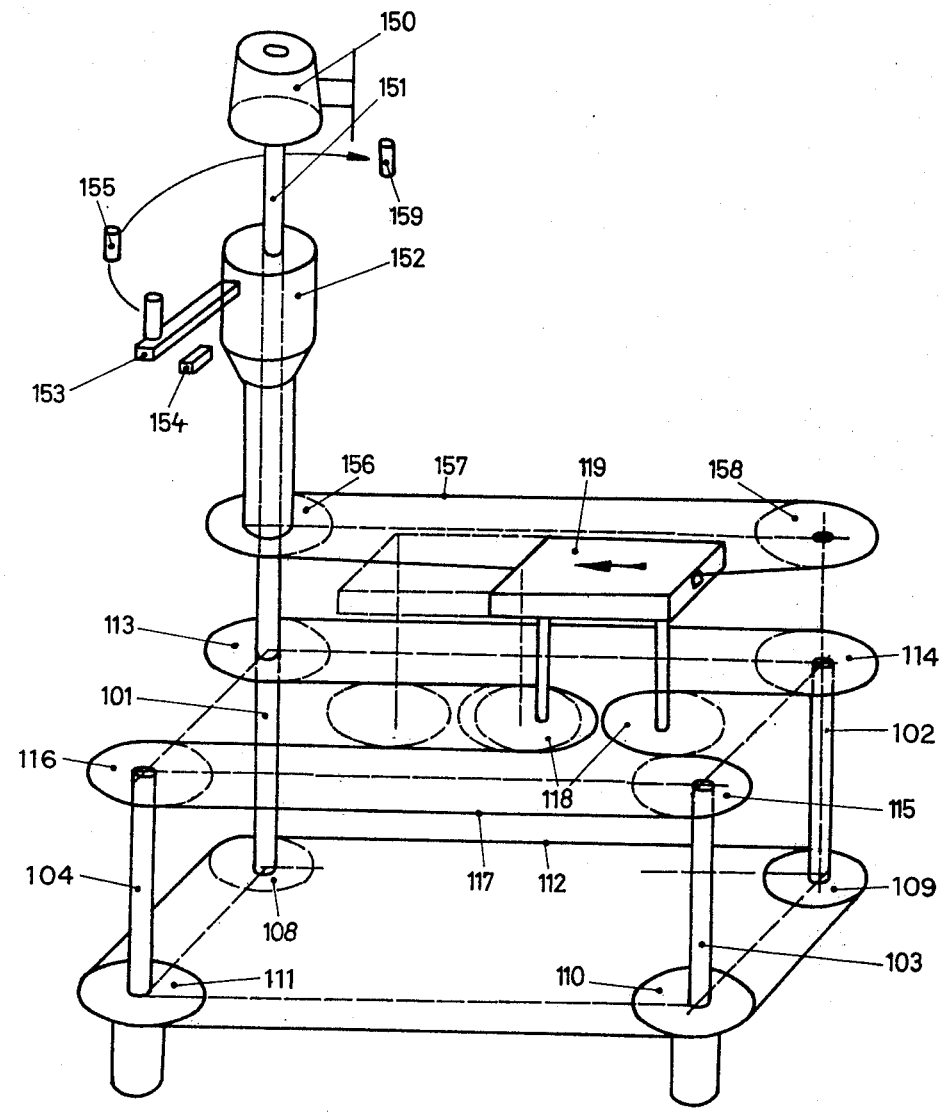
FIG. 4 is a second illustrated embodiment of apparatus according to the invention.

In operation, tool electrode 5 is lowered in a known manner into the work piece 3 for coarse machining. After it has penetrated into the work piece 3, the latter is set into circling motion, the plane of which is perpendicular to the usually vertical path of the tool electrode. The tool electrode meanwhile stands still in position. The eccentricity of the circular movement is continuously increased from zero value to a maximum desired value corresponding to the conditions for fine machining. The entire working surface of tool electrode 5 machines the work piece, so that the erosion process can be carried out at maximum possible power. During fine machining the radius of eccentricity is so controlled that the removal power is very high and no short circuit can occur in the working gap between the tool electrode 5 and the work piece 3. The continuous changing of the eccentricity radius will be discussed further below in connection with a particular embodiment of the invention. In the application of the illustrative embodiments shown in FIGS. 2, 3, and 4 the work piece 3 is fixed to a carrier described with reference to one or more of those figures, either with the supports 4 or without the supports (i.e. fixed directly on such a carrier. The mechanisms shown in FIGS. 2, 3, and 4 are, for example, set into the container 2 shown in FIG. 1B. The possibility is also evident that the container 2 together with the work piece 3 may be fixed on one of the carriers shown in FIGS. 2, 3, and 4, as shown in FIG. 1C. In the case of the embodiment shown in FIG. 7 the container 2 with the work piece 3 arranged within it are fixed on the horizontally movable cross table 9 which is generally provided in an electroerosion machine anyway and which is only schematically indicated in FIG. 1A.

The mechanism shown in FIG. 2 comprises a housing 10 and a carrier 11 in the form of a table plate. The housing and carrier are made impervious so that the dielectric or electrolytic medium which is provided in the container 2 of FIG. 1B cannot penetrate into the mechanism of FIG. 2, a precaution which is not necessary in the arrangement of FIG. 1C. In the housing or casing 10 are located four shafts 101, 102, 103, and 104. A motor 105 drives shaft 101, for example, by means of a worm gear drive 106, 107. The drive can also be provided without the speed reduction of the worm gear linkage. The wheels 108, 109, 110, and 111 fixed near the respective lower ends of shafts 101, 102, 103, and 104 are linked by a belt 112 which may be a cord, strap or chain. The wheels 108, 109, 110 and 111 continuously drive the shafts on which they are mounted and may be referred to as the first group of wheels of the mechanism. At the upper end of these shafts 101, 102, 103 and 104 are located wheels 113, 114, 115 and 116 belonging to a second group. Among the wheels of this second group only one wheel, the wheel 113, is mounted fast on its shaft, the shaft 101. It drives the other wheels 114, 115 and 116 by means of a belt 117 which, likewise, may be a cord, strap or chain, for example. These other wheels 114, 115 and 116 are mounted loosely enough on their shafts 102, 103 and 104 respectively so that they may rotate relative to the shafts while still being held in position. The belt 117 also drives the wheels 118 which are mounted rotatably on a plate 119. A positioning rod 120 is provided to shift the plate 119 either to the left or to the right in the same plane as the wheels 113, 114, 115 and 116 of the second group. One end of the positioning rod 120 is fastened to the plate 119 by a suitable joint or connection and its other end is connected with a motor (not shown) or with a hydraulic or pneumatic driving element 120a shown in dashed lines connected to a control system 120b.

When the motor or driving element just mentioned shifts the location of plate 119 by means of positioning rod 120, the wheels 113, 114, 115, 116 and 118 receive an additional or superposed rotational movement which causes wheels 114, 115 and 116 to be rotated relative to their mounting shafts 102, 103 and 104. These wheels are so mounted on their shafts as to provide an eccentricity. This feature will be discussed later in detail in connection with FIG. 3.

As shown in the schematically diagramed mechanism of FIG. 2, the shafts 103 and 104 each have an eccentric pivot 121 associated with it. This eccentric pivot is in each case seated in a bearing 122 of the table plate 11. FIG. 2 shows schematically by means of an exploded view the seating of both of these eccentric pivots in bearings 122. It is of course obviously possible to provide the eccentric pivot formed by only one shaft with a bearing 122 in the table plate 11 if other means are present to assure that the motion imposed on the table plate 11 will produce a circling of the table plate and to prevent a rotation (i.e. to keep the straight edges of the carrier 11 always parallel to a fixed direction). Let it now be assumed that the mechanism shown in FIG. 2 the eccentric pivots 121 are alignment with the axes of the two shafts 103 and 104. Drive motor 105 now drives all the shafts 101, 102, 103 and 104 and all the wheels 108, 109, 110 and 111 of the first group as well as the wheels 113, 114, 115 and 116 of the second group and the wheels 118 of the plate 119. Eccentricity is not present, so that the table plate 11 performs no circling motion. If now plate 119 is shifted by means of the motor or other drive element acting through the positioning rod 120, an eccentricity e will be set in, in the same measure by the relative shifting of eccentric pivots 121. During this circling movement the rectilinear edges of the table 11 remain parallel to the same direction; that is, the table 11 does not rotate in orientation. This is indicated in FIG. 2 by the double representation of the pivots in the bearings 122 of the table plate 11 on which the work piece 3 is held fast. The table plate 11 and the work piece 3 perform a circling movement which is indicated by the arrow 123.

The magnitude e of the eccentricity is likewise indicated in FIG. 2. By shifting plate 119 in the one direction or the other the magnitude e of the eccentricity can be varied continuously either from zero value up to the maximum desired value or form the maximum value down to zero. The control of the eccentricity can be accomplished either by an operator's manipulation of the positioning rod 120 or by the control of a motor (not shown) or pneumatic or a hydraulic drive element 1202.

It is also comtemplated that the adjustment and change of the eccentricity can be controlled by a program applied to the motor or drive or by the use of a numerical control system instead of or in supplement to other programming. Numerical control of electroerosion equipment is described in Swiss Pats. No. 513,693 and 513,694, which correspond to U.S. Pats. No. 3,731,045 and No. 3,731,043, respectively. With that type of numerical control system the data for the desired adjustment and variation of the eccentricity can be programmed in a common program with the data for the advance of the tool electrode 5 into the work piece. The control operates in such a manner that the machining of the work piece 3 by the electrode 5 proceeds under optimum conditions with maximum removal power and at the same time any short circuit between the tool electrode and the work piece is prevented. Such a control naturally includes a protective system with all appropriate interlocks. By the combination of automatic eccentricity adjustment and circling movement with the data for the feed in the penetration direction great advantages can be obtained in the machining process, among them:

a. penetration coarse machining and reaming smooth machining, together with an aftercorrection in the penetration direction for the forward surface erosion can be carried out automatically one after another without intermediate interference by service personnel, b. conical profile indentations can be produced by combined penetration and circling movement, c. by correspondingly bent or offset electrodes undercut profiles may be produced on single units, in multiple or repeatedly.

It should further be remarked that the same equipment can be employed for reaming out of inner contours (engravings) and in the opposite electroerosion direction for machining down outer contours. In the latter case the tool electrode can then be arranged in cup or bell form to enclose the work to be finished.

FIG. 3 shows the physical construction form of the shaft 103, wheels 110 and 115 and the seating of eccentric pivot 121 in table plate 11. This form of construction holds likewise for the shaft 104 with its wheels 111 and 116 and the eccentric pivot 121 in the bearing 122, as well as for other shafts that might be included in the mechanism, for example, shaft 102 with its wheels 109 and 114.

As shown in FIG. 3 a positioning stud 130 is located on the floor of the housing or casing 10. The shaft 103 is seated on the positioning stud 130 by means of ball bearings 131 indicated symbolically in FIG. 3. Wheel 110 is a gear wheel, which as shown in FIG. 2 is driven continuously by the chain 112 and rotates the shaft 103, because wheel 110 is held fast to the shaft 103 by means of the screw 132. Wheel 115, which belongs to the second group of wheels, is likewise in the form of a gear wheel and it is likewise continually driven by the motor 105 acting through the chain 117. Wheel 115 is held fast to the structural part 134 by means of screw 133 but is freely seated on shaft 103 by means of ball bearing 135 so that it can be rotated relative to shaft 103 by the eccentricity adjustment to be described later.

The eccentric pivot 121 shown in FIG. 2 appears in FIG. 3 in the form of the ring 121. The annular "eccentric pivot" 121 is seated in an annular bearing 137 of the table plate 11 and at the same time, by means of the bearing 136, is also seated eccentrically on the rotating shaft 103. A pin 138, in the form of a short rod, is held fast at one end in the ring shaped "eccentric pivot" 121 while its other end protrudes into a radial slit 139 of the gear wheel 115. In the position shown in FIG. 3 for the pin 138 relative to slit 139 the eccentricity is zero. As soon as the plate 119 of FIG. 2 is shifted in one or the other direction, gear wheel 115 will revolve relative to the rotating shaft 103 which is turning at normal speed. The free end of pin 138 will, as shown in FIG. 3, will be carried along by the radial slit 139 of gear wheel 115 corresponding to the described relative rotation and will set the "eccentric pivot" 121 into an eccentric position by rotation on bearing 136. The table plate 11 now performs a circling movement. FIG. 3 shows the new axis 140 which the "eccentric pivot" 121 may acquire after an operation of the type just described.

Whereas in the mechanism of FIG. 2 a drive motor 105 and an adjustment mechanism for shifting plate 119 by means of positioning rod 120 are provided, in FIG. 4 a simplified mechanism is shown with only one servocontrolled motor 150. The motor 150 serves both for the drive and for the setting of the eccentricity.

Motor 150 drives shaft 101 by means of another shaft 151. Shafts 102, 103 and 104 are rotated by means of wheels 108, 109, 110 and 111 of the first group which are coupled together by the belt 112. The wheels 113, 114, 115 and 116 of the second group are likewise coupled together by the belt 117. The belts 112 and 117 can as already described be cords, straps or chains, for example. Wheel 113 of the second group is mounted fast on shaft 101 (and shaft 151 in the embodiment of FIG. 4) so that the other wheels 114, 115 and 116 of the second group are driven and are able to rotate relative to the shafts 102, 103 and 104 with which they are associated. The belt 117 leads around additional wheels 118 of the plate 119.

FIG. 4 shows an embodiment that may be used instead of that of FIG. 2. The shaft 151 is surrounded by a bushing 152. Between bushing 152 and rotating shaft 151 of motor 150 is a friction controlled connection. A lever 153 is provided on bushing 152. In FIG. 4 this lever lies against its zero stop 154. Let it now be assumed that the motor 150 turns around to the right (clockwise from above). The bushing and with it the lever 153 will be rotated in the same direction because of the friction engagement with motor shaft 151. This rotation is of course controllable by adjustment of the friction between shaft 151 and bushing 152. The entrainment of the bushing 152 can also be produced by a more firm coupling, for example, by means of a ratchet and pawl which will become disengaged upon reaching the stop position 155.

Wheel 156 is fastened to the lower end of bushing 152 and is rotated by the movement of bushing 152 away from stop 154 towards stop 155. As a result belt 157 which passes around wheel 158 as well as wheel 156 will shift plate 119 into the position shown by dashed lines. In consequence, as already described in connection with the embodiment shown in FIG. 2, a controlled variation of the eccentricity, in fact from the zero value (lever 153 against stop 154) to the greater value 155 and up to a maximum value 159. For example the desired value of eccentricity can be selected by the stops for the lever 153. If, for example, a maximum eccentricity corresponding to position 155 is desired, a stop can be set there, so that lever 153 cannot go further than stop 155 when motor 150 turns in the direction just described. If motor 150 and its drive shaft 151 turn in the other direction, bushing 152 will likewise turn in the other direction, so that the eccentricity will be reduced. Such a reversal of the regulated motor 150 can take place, for example, if a short circuit or other malfunction should occur in the working gap between the electrode 5 and the cavity of the work piece 3 (FIG. 1). In such a case the eccentricity will be reduced so that the short circuit or other malfunction in the working gap between tool electrode and work piece will immediately be cleared.

It should be further remarked that in the representation of the embodiment of the invention of FIG. 4 the table plate 11 on which the work piece 3 is held fast is not shown.

The mechanism of FIG. 4 can, like that of FIG. 2, be provided with program control and/or numerical control, of the kind for which reference is made to Swiss Pats. No. 513,693 and 513,694 as well as German Pat. 2,025,161, these patents corresponding respectively to U.S. Pats. No. 3,731,045, 3,731,043 and 3,731,044.

For example the tool electrode 5 may first be lowered or advanced into the work piece 3 under coarse machining conditions. It is then advanced to a program depth on the reaching of which the program then causes the table plate 11 to move in a circling motion provided by motor 150 so that the fine machining can be carried out. The data for the advancement of the tool electrode and for the setting of the eccentricity are programmed on an information carrier provided to such a numerical control system and control the entire process while taking full account of the conditions in the working gap between the tool electrode and the work piece.

Figure 5:
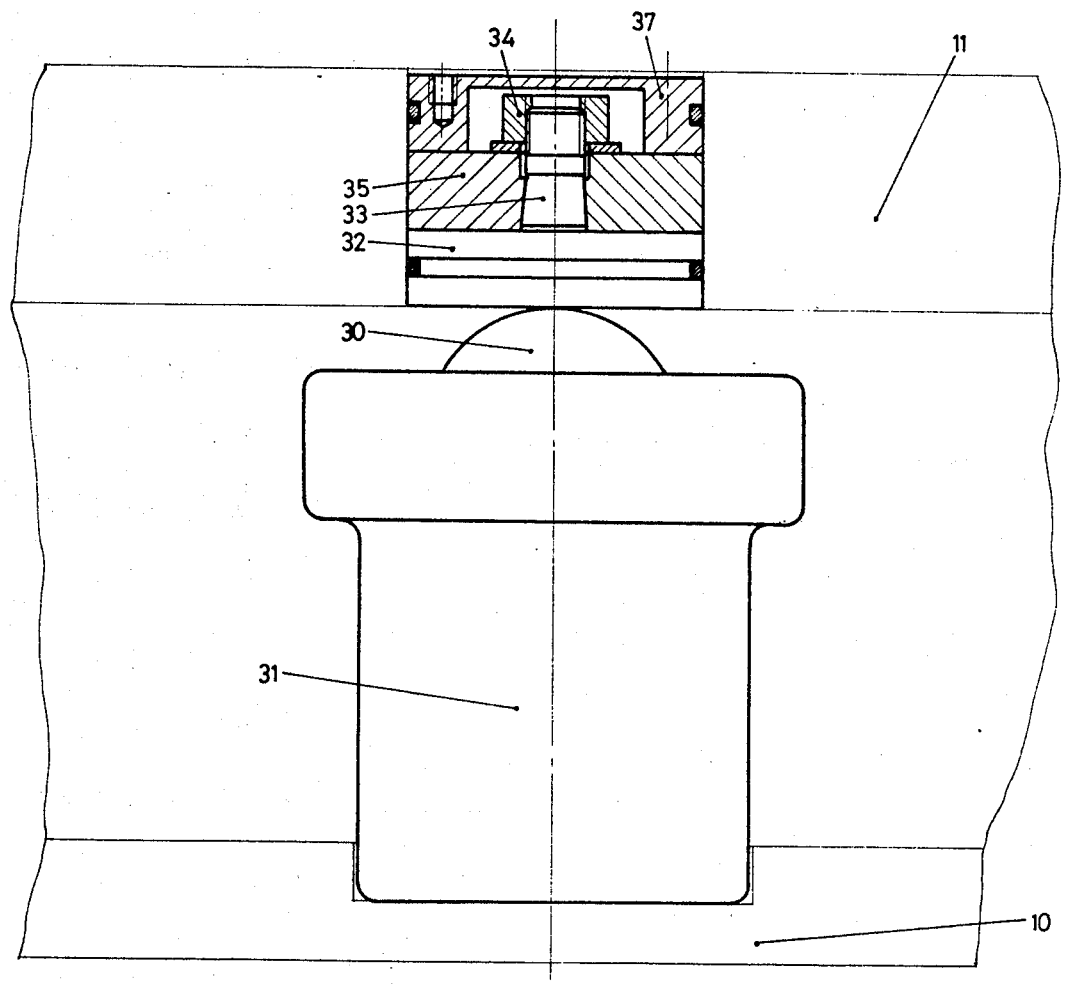
FIG. 5 is an elevation view, partly in section, of a means for supporting the work piece carrier for the two embodiments of the invention shown in FIGS. 2 and 4.

FIG. 5 shows how the table plate 11 of the mechanism shown in FIG. 2 and the corresponding unshown table plate of the mechanism of FIG. 4 is seated on the housing 10. It may be assumed for his case that, in accordance with FIG. 2, two parallel eccentric drive studs 121 are provided in the bearings 122 of table plate 11 and that the support requirement involves only downwardly directed forces. The table plate 11 is in this case seated on, for example, four or more ball elements. Such a seating arrangement serves for vertical support of the table plate.

Figure 6:
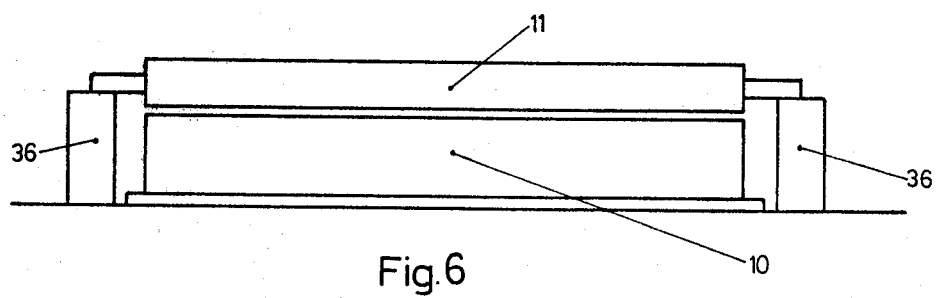
FIG. 6 is an elevation view of a leveling mechanism for use in either of the embodiments shown in FIGS. 3 and 4.

In FIG. 5 such a seating arrangement is shown. In the casing 10 a bearing pedestal 31 is held fast in which a ball 30 is seated. The bearing is completed by bringing the upper surface of the ball 30 together with a plate 32 which is adjustably held in a cavity of the underside of table plate 11 by means of the screw 33, the nut 34 and the clamp ring 35. By means of this adjusting arrangement the table plate 11 can be leveled by setting the bearing plates 32 at the proper level in each of the bearings. The leveling operation with such an arrangement is illustrated by means of FIG. 6. The table plate 11 is first leveled by means of auxiliary supports 36. Then by means of screw 33, nut 34 and clamp ring 35 the bearing plate 32 is brought into contact with the ball bearing 30. The same is then done for each of the other bearings 30, 31 provided in the housing 10. Once the table plate 11 is thus leveled the auxiliary supports 36 are removed.

A fluid tight cover 37 (FIG. 5) is provided on each of the bearing adjustments for their protection. Likewise an elastic barrier (not shown) is provided between the table plate 11 and the housing 10 to keep fluids out of the mechanism. As already stated in connection with FIG. 1, the mechanisms of FIGS. 2, 3, and 5 or of FIGS. 3, 4 and 5 can be set into the container 3. Since the latter contains a dielectric or electrolytic fluid, the housing itself must be fluid proof and for this purpose it may be desirable to treat the inner surface with a suitable coating.

Figure 7:
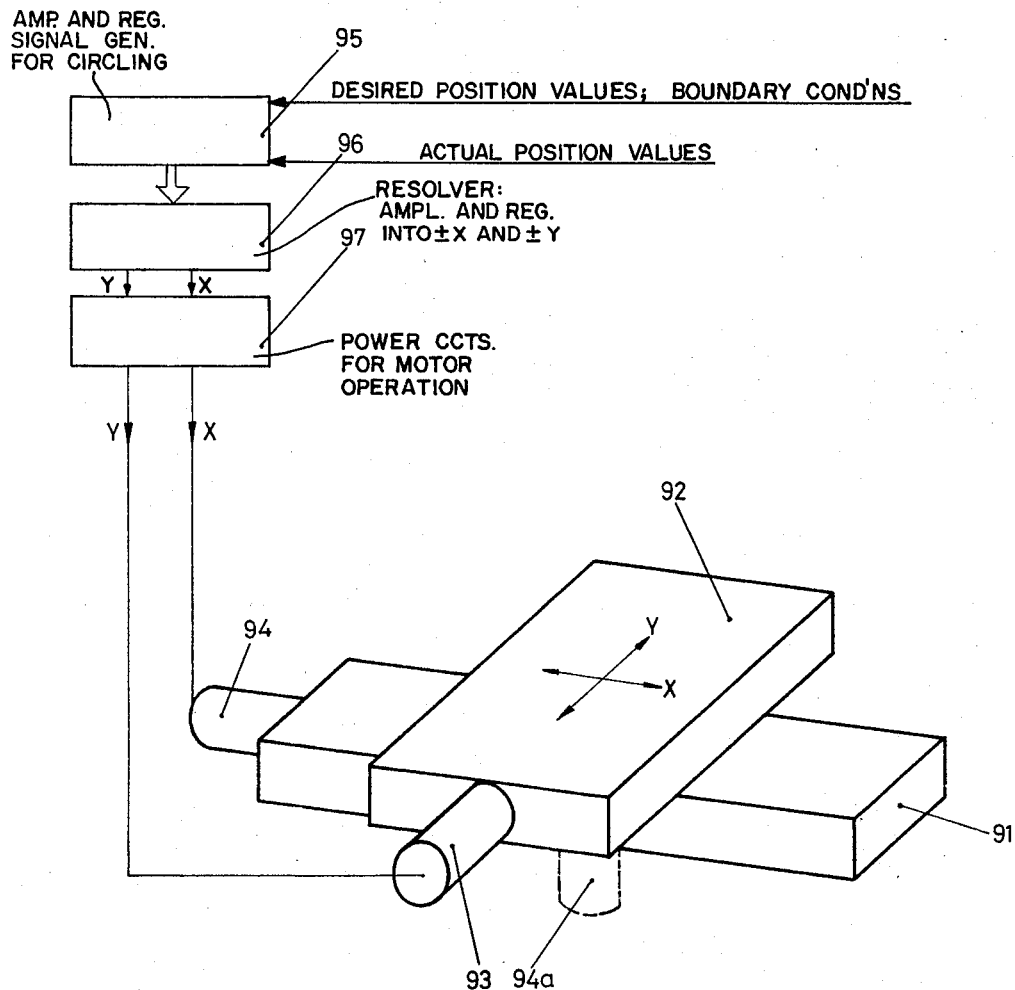
FIG. 7 is a perspective view, partly in block diagram, of a third illustrative embodiment of the invention.

FIG. 7 shows a further illustrative embodiment of the invention making use of the cross table 9. The location of this cross table in an electroerosion machine is indicated in FIG. 1. The cross table 9 consists mainly of the two superposed positioning drives 91 and 92. Each of these drives is in the form of a motor driven machine carriage and has its own individual drive motor, shown respectively at 93 and 94. These motors may be stepping motors or some other type of drive controlled by a digital measuring or positioning system. Each positioning drive is provided for one of the two coordinate directions x and y, as symbolically shown on the surface of positioning drive 92 in FIG. 7.

The container 2 and the work piece 3 of FIG. 1A are located on top of positioning drive 92 shown in FIG. 7.

After the electrode 5 has performed the coarse machining in work piece 3 with the help of the feed mechanism 6, the circling movement of cross table 9 is set into motion. The control of the positioning motors is accomplished with a special electric circuit adapted to regulate the degree of eccentricity in terms of the signal amplitude and to produce and regulate the circling movement of the table by the distribution of signals to the two positioning drives 93 and 94. It is also possible to utilize a numerical type of control here, of the kind illustrated in detail in the previously cited patents. In FIG. 7 only the outlines of the control system are shown, as that is sufficient for its understanding in this connection.

The circuit 95 has two inputs. The control system, which develops control signals from a program either on a numerical basis or otherwise, not shown in the drawings, provides command signals in terms of the desired positions to be established by the positioning drives, which may hence be referred to as desired values. These command signals are provided to the upper input, whereas actual values of positions of the driven portions of the table derived from translating apparatus, not shown, mounted on the table, are provided to the lower input of circuit 95. These position indications are supplemented in circuit 95 by boundary conditions specified for the beginning and end of the operation. In circuit 95 the desired values are continually compared with the actual position values and resultant signals are generated representing the amplitude and direction of movement to be produced, for further processing in circuit 96. In circuit 96 the signals received from circuit 95 are resolved into coordinate phases in order to provide electrical signals for the respective motors 93 and 94.

Motors 93 and 94 are supplied with electrical energy from power unit 97 and receive signals from circuit 96 which are so coordinated in relative phase that the eccentricity is adjustable in the desired manner. The two positioning drives 91 and 92 are thereby so activated in the $x, y$ plane that their combined operation provides a circling movement to the work piece 3.

It should be explained at this point that the cross table 9 can also be so driven that the movement departs from circular form and, for example, may be elliptical. With the apparatus of FIG. 7 the maximum value of eccentricity can also be adjusted. This can be done by setting in at the upper input of circuit 95 also the greatest permissible value of the amplitude for the eccentricity in the form of an electrical signal.

The cross table 9 of FIG. 7 can also be used in somewhat modified form. Thus, the motor 94 can be arranged in relation to the positioning drive 91 as shown in the dashed lines at 94a. In this case the positioning apparatus 91 is rotated about the axis of motor 94a. With the help of motor 93 and positioning apparatus 92 the eccentricity can be adjusted. This type of operation involves a so-called planetary mounting of the container 2 and the work piece 3, which performs a circling movement with the desired eccentricity.

It is noteworthy that the tool electrode 5 can have any desired cross section, as for example circular, elliptical or polygonal. The electrode can also have attachments or extensions. During the movement of the work piece 3 with a particular eccentricity during fine machining the geometry of the tool electrode is copied or impressed in the cavity or engraving of the work piece 3.

Preferably with the embodiment of the invention shown in FIG. 7, but also with a machine in accordance with FIG. 2, it is possible to operate the mechanism as required in particular cases with suitable corresponding control, in such a manner that:

a. the circling movement runs continuously and the eccentricity is regulated so that it increases up to a limit value, or b. the eccentricity is regulated without circling movement up to a limit value in a predetermined coordinate direction for a preliminary stage of machining and a completely circular or modified circular (for example elliptical) movement is thereafter carried out, c. the circling movement and the variation of eccentricity are so synchronized with respect to each other that predetermined spiral or polygonal operating curves arise.

The term "eccentricity" has been used to describe the radius of the circling movement because as explained in connection with FIG. 3, this parameter is determined by rotatably shifting the eccentrically mounted ring 121 from a position where its own eccentricity exactly compensates for the eccentricity of its mounting, which can be done up to a point where these two eccentricities add instead of compensate, providing a maximum effective eccentricity after 180° of relative movement. Of course if the circling movement is provided without the use of an eccentric member such as the eccentric ring 121 of FIG. 3, as for example in the case of the electrical generation of the control utilized in the system of FIG. 7, it might be more appropriate to use a name other than "eccentricity" for the radius of the circlng movement. This is particularly apparent when it comes to utilizing "eccentricity" in only one coordinate direction, as stated in paragraph (b) just above, where the movement then becomes a simple back and forth movement. In this connection it may be mentioned that the combination of sinusoidal movements at right angles to provide circular, elliptical and even rectilinear movements is well known. For purposes of consistency, however, the term "eccentricity" has been used throughout to refer to the radius of the circling movement produced, which, after all, refers to the deviation from the center of motion.

We claim:

1. A method of uniformly distributing the electroerosion effect of a tool electrode on a workpiece in at least the finishing stage of electroerosion machining, using the same tool electrode used for the roughing stage, said tool electrode being controlled as to relative approach of said electrode and said workpiece by a working-gap regulation system for avoidance of short circuits and provision of a relatively high rate of removal of material, comprising the steps of:

advancing a tool electrode (5) into a workpiece (3) mounted on a movable carrier under control of said working gap regulation system;

subjecting said carrier, at least after the advancement of said tool electrode into said workpiece is completed, to a circular displacement motion perpendicular to the direction of said advancement, which motion is such as not to rotate said carrier in its orientation about the axis of said circular motion, and varying the radius of said circular displacement motion while said motion is going on in a manner subject to control by the same working-gap regulation system used to control relative approach of said tool and workpiece during said roughing stage for avoidance of short circuits and provision of a relatively high rate of removal of material.

2. Apparatus for electro-erosion machining of a workpiece with an electrode tool having means for uniform distribution of erosion effect over the machined surface for fine machining while using the same electrode tool used for coarse machining, said tool electrode being controlled as to relative approach of said electrode and said workpiece by a working-gap control system for avoidance of short circuits and provision of a relatively high rate of removal of material, said apparatus comprising:

a carrier for said workpiece in the form of a cross table (9);

drive motors (93, 94, 94a) for said cross table adapted to provide together a circling motion to said cross table without rotation thereof in orientation, and electric control means adapted to vary the radius of said circling motion subject to the same working-gap control system for relative approach of tool and workpiece used for coarse machining with said tool, for avoidance of short circuits and provision of a relatively high rate of removal of material.

3. Apparatus for electro-erosion machining of a workpiece with an electrode tool having means for uniform distribution of erosion effect over the machined surface for fine machining while using the same electrode tool used for coarse machining, said apparatus comprising:

a carrier (11) for said workpiece movably mounted on a plurality of bearings (137) in each of which is rotatably mounted a first member (121) of an eccentric pivot which has a second member (103) rotatable in a bearing (131) fixed on a work table member (9);

first drive means (110, 111, 112) for rotating the said second members (103, 104) of each of said eccentric pivots;

second drive means (115, 116, 117) for rotating the first members (121) of each of said eccentric pivots, and control means (118, 119, 120, 152-157) for producing rotation of said first members (121) of each of said eccentric pivots relative to the corresponding respective second members (103, 104) of said eccentric pivots without interrupting the operation of said first and second drive means, said first and second drive means being provided with means (105, 106, 101, 108, 113, 109, 114) for their operation in synchronism with each other except during operation of said control means, said eccentric pivots being so formed that, for one position of the first and second members thereof relative to each other, the synchronous operation of said first and second drive means produces substantially no motion of said carrier, whereas for other positions thereof said carrier is subjected to a circling motion, the radius of which is continuously controllable by said control means.

4. Apparatus as defined in claim 3 in which:

said means for operation of said first and second drive means includes a first set of wheels (108, 109) cooperating with wheels (110, 111) of said first drive means and a second set of wheels (113, 114) cooperating with wheels of said second drive means;

a motor (105) is provided to drive wheels of said first set and of said first drive means and also wheels of said second set and said second drive means, and said control means (119, 120) operates to shift the rotation phase of wheels of said second drive means (115, 116) relative to one wheel (113) of said second set driven by said motor and thereby to shift the relative rotational phase, in which the operation of said first and second drive means is synchronized and thereby shifts said second members (121) of said eccentric pivots relative to the respective first members (103, 104) thereof.

5. Apparatus as defined in claim 4 in which said wheels (108, 109, 110, 111) of said first set and first drive means and said wheels (113, 114, 115, 116) of said second set and second drive means are mounted in pairs on shafts (101, 102, 103, 104) each of some of which carries one wheel of each set and each of the remainder of which carries one wheel of each of said drive means, the shafts carrying wheels of said drive means constituting said second members of said eccentric pivots, whereby the wheels of said first drive means drive those said shafts on which they are respectively mounted and the wheels of said second drive means rotate freely on the said shafts on which they are respectively mounted and rotate with the same velocity except when said wheels (115, 116) of said second drive means provide, in response to said control means, a relative movement with respect to said shafts on which they are mounted and in so doing act on said first members of said eccentric pivots.

6. Apparatus as defined in claim 4 in which said radius increases or decreases according to the direction of the relative rotation of said wheels (115, 116) of said second drive means with respect to shafts (103, 104) on which they are respectively mounted, and in which, further, driving force is communicated among wheels of said first set and of said first drive means and likewise among wheels of said second set and of said second drive means by means of a belt or chain drive, and in which, further, said control means includes rectilinearly shiftable wheels (118) connected to the belt or chain drive of said wheels of said second set and of said second drive means.

7. Apparatus as defined in claim 6 in which there is provided a motor (150) for driving said first and second drive means and also for operating an adjusting drive (119) constituting part of said control means and including provisions for at least partially automatic operation of said control means.

8. Apparatus as defined in claim 7 in which said motor (150) is arranged to drive said adjusting drive (119) through friction clutch means (152) so arranged in said control means that the radius of circling motion of said carrier (11) will increase or decrease according to the direction of the rotation of said motor (150).

9. Apparatus as defined in claim 4 in which the first member (121) of each of said eccentric pivots is shiftable relative to the axis of the second member (103) of such eccentric pivot by means of a projecting pin (138) held in said first member and of which the free end engages a slit (139) of one of said wheels (115) of said second drive means.

10. Apparatus as defined in claim 8 in which said motor is arranged to drive a shaft (101, 151) on which is affixed a wheel of said first set and a wheel of said second set and said friction clutch is arranged to transmit motion controllably from said shaft through a belt drive output (157) for displacement of said rectilinearly shiftable wheels.

11. Apparatus as defined in claim 3, in which said carrier (11) is mounted on ball elements (30, 31) and in which the surfaces (32, 33, 34) engaging said ball elements opposite said carrier are adjustable for leveling said carrier.

12. Apparatus as defined in claim 3 in which said first members (121) of said respective eccentric pivots are outer members thereof mounted externally on second members (103, 104) of said eccentric pivots so that said second members constitute inner members of said pivots.

* * * * *

UNITED STATES PATENT OFFICE
CERTIFICATE OF CORRECTION

PATENT NO. : 3,975,608
DATED : August 17, 1976
INVENTOR(S) : Werner ULLMANN et al.

Figure 1A:
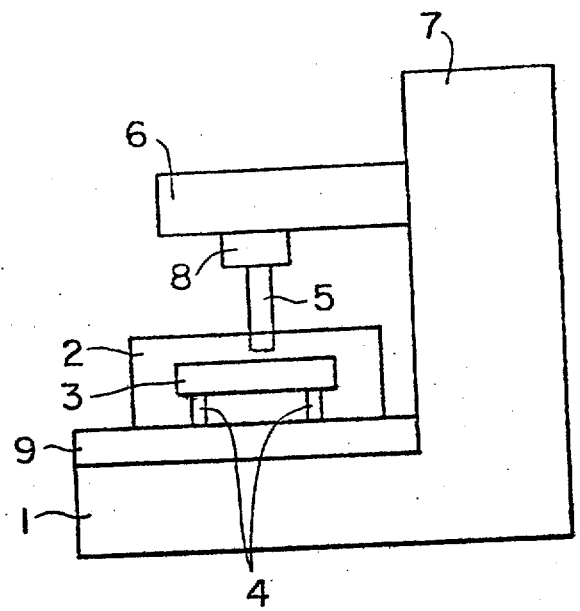
Figure 1B:
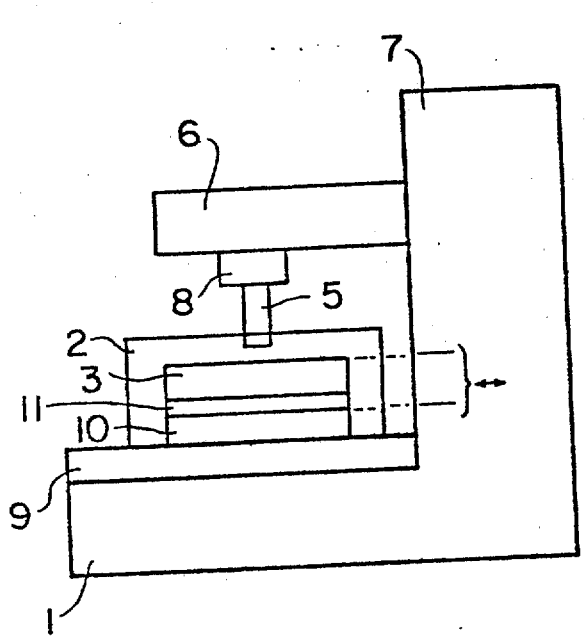
FIG. 1B is a side elevation view of an electroerosion machine provided with a separate workpiece carrier unit for the practice of the invention that is located inside a container provided for a dielectric medium or an electrolytic medium used in the erosion process.
Figure 1C:
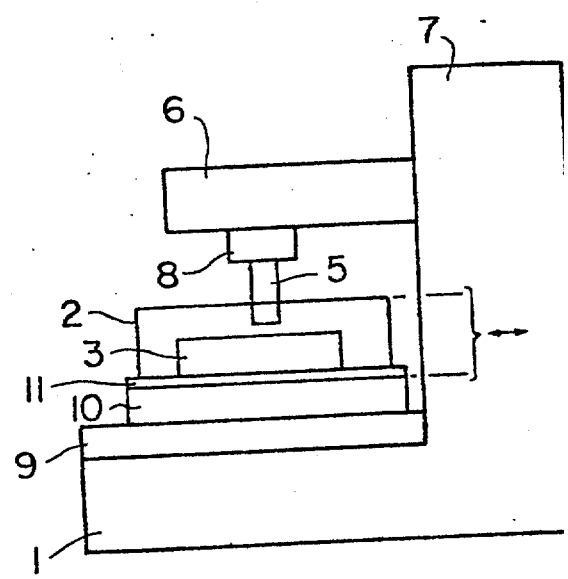
FIG. 1C is a side elevation view of an electroerosion machine provided with a separate workpiece carrier unit for the practice of the invention which is located beneath a container for confining the dielectric medium or the electrolytic medium used in the erosion process.

It is certified that error appears in the above–identified patent and that said Letters Patent are hereby corrected as shown below:

Please substitute the sheet of drawings containing Fig. 1A, 1B and 1C, attached hereto, for the old sheet of drawings containing Fig. 1, which was inadvertently printed with the Official Patent Deed.

Signed and Sealed this

Seventh Day of December 1976

[SEAL]

Attest:

RUTH C. MASON
*Attesting Officer*

C. MARSHALL DANN
*Commissioner of Patents and Trademarks*